(12) United States Patent
Frenger et al.

(10) Patent No.: US 11,342,965 B2
(45) Date of Patent: May 24, 2022

(54) TRANSMISSIONS OF BLOCKS OF DATA IN DISTRIBUTED MIMO SYSTEMS

(71) Applicant: Telefonaktiebolaget LM Ericsson (publ), Stockholm (SE)

(72) Inventors: Pål Frenger, Linköping (SE); Emil Björnson, Hägersten (SE); Erik G. Larsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 195 days.

(21) Appl. No.: 16/614,181

(22) PCT Filed: Mar. 7, 2018

(86) PCT No.: PCT/EP2018/055575
§ 371 (c)(1),
(2) Date: Nov. 15, 2019

(87) PCT Pub. No.: WO2018/210463
PCT Pub. Date: Nov. 22, 2018

(65) Prior Publication Data
US 2021/0288694 A1  Sep. 16, 2021

Related U.S. Application Data

(60) Provisional application No. 62/508,716, filed on May 19, 2017.

(51) Int. Cl.
*H04B 7/024* (2017.01)
*H04B 7/06* (2006.01)
(Continued)

(52) U.S. Cl.
CPC ........... *H04B 7/024* (2013.01); *H04B 7/0602* (2013.01); *H04L 1/0668* (2013.01); *H04L 5/0023* (2013.01)

(58) Field of Classification Search
CPC ..... H04B 7/024; H04B 7/0602; H04L 1/0668; H04L 5/0023
(Continued)

(56) References Cited

U.S. PATENT DOCUMENTS

2012/0212372 A1  8/2012 Petersson et al.
2015/0381335 A1* 12/2015 Khojastepour et al. .. H04L 5/16
(Continued)

FOREIGN PATENT DOCUMENTS

CN     101826944 A    9/2010
EP     2728768 A1     5/2014

OTHER PUBLICATIONS

Bauch, Gerhard, et al., "Multiple Antenna Systems: Capacities, Transmit Diversity and Turbo Processing", XP-001119578, Jan. 28, 2002, pp. 387-398.

*Primary Examiner* — Fitwi Y Hailegiorgis
(74) *Attorney, Agent, or Firm* — Murphy, Bilak & Homiller, PLLC

(57) ABSTRACT

A method (200) of transmitting a block of data in a distributed MIMO system is disclosed. The distributed MIMO system comprises a plurality of access points ($A_1, \ldots, A_K$), wherein access points ($A_j$) are grouped into a first set of M groups and a second set of M groups, different from the first set, wherein M is an integer. A first antenna port mapping assigns each group of the first set to a unique one of M antenna ports. A second antenna port mapping assigns each group of the second set to a unique one of M antenna ports. The method comprises transmitting (220) the block of data using both the first and the second antenna port mapping.

11 Claims, 8 Drawing Sheets

(51) Int. Cl.
*H04L 1/06* (2006.01)
*H04L 5/00* (2006.01)

(58) Field of Classification Search
USPC .................................................. 375/260, 267
See application file for complete search history.

(56) References Cited

U.S. PATENT DOCUMENTS

2016/0037550 A1* 2/2016 Barabell et al. .. H04W 72/1263
2018/0205434 A1* 7/2018 Cherian et al. ...... H04B 7/0613

* cited by examiner

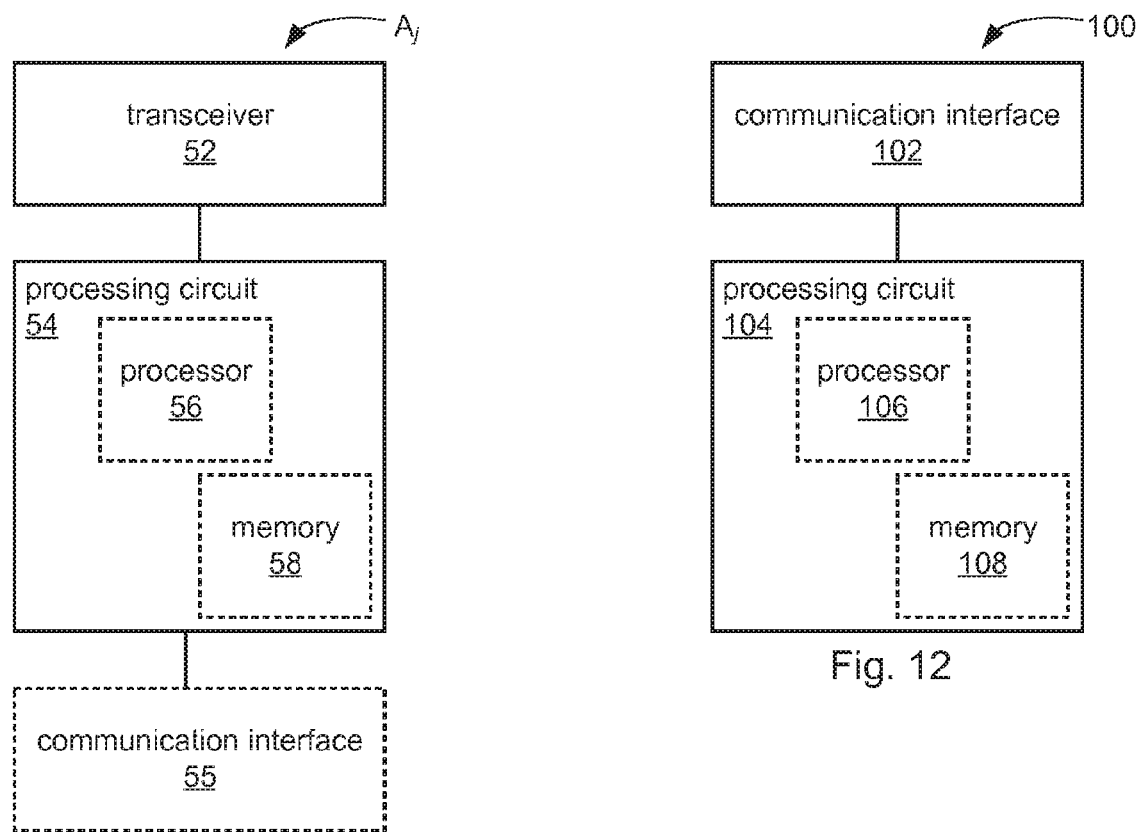
Fig. 11
Fig. 12
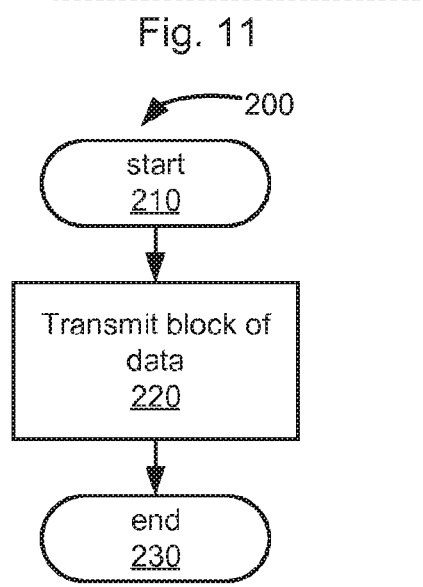
Fig. 13
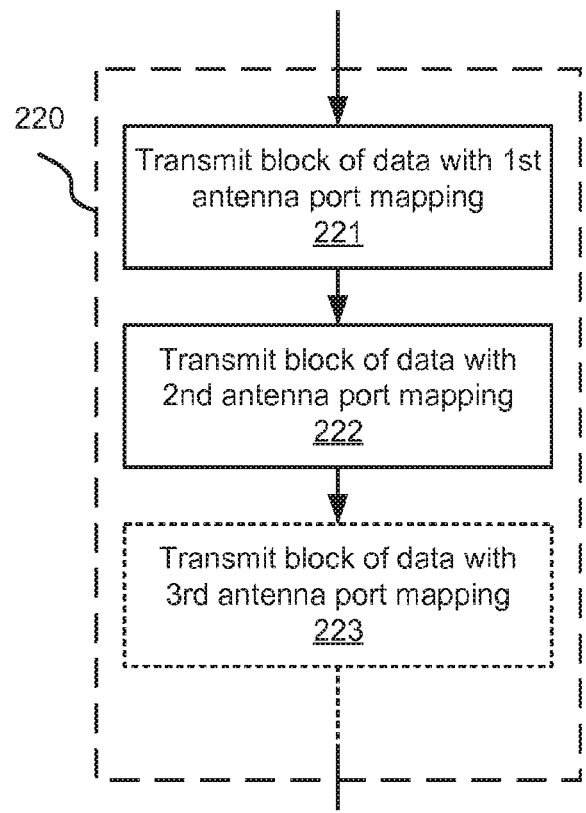
Fig. 14

TRANSMISSIONS OF BLOCKS OF DATA IN DISTRIBUTED MIMO SYSTEMS

TECHNICAL FIELD

The present disclosure relates to transmissions, such as wide-area transmission, of blocks of data in distributed MIMO (Multiple Input Multiple Output) systems, such as distributed massive MIMO systems.

BACKGROUND

The coverage of a cellular network is defined by the area over which the essential system information can be received and correctly decoded at the user terminals. There are several existing solutions for system information broadcast in cellular networks, particularly focusing on the case where each base station is equipped with an array of co-located antennas.

The system information can be broadcasted independently and orthogonally in neighboring cells. The transmission can be omni-directional, within the sector covered by the corresponding base station. Alternatively, beam-sweeping can be performed over the sector, by using a predefined grid of angular beams. The latter can improve the SNR (Signal-to-Noise Ration) for the users that are within the beam's coverage, at the cost of consuming more resources for the broadcasting.

Another option is multi-cell broadcasting in a single-frequency network fashion, where all base stations broadcast the same system information simultaneously at the same frequency.

This solution provides macro-diversity, particularly for cell edge users, but also increases the delay spread and small-scale fading of the received signal at each user terminal.

As the cellular networks are densified, the inter-cell interference become a major issue. Cell-free massive MIMO (also known as "distributed antenna system" or "distributed massive MIMO") is a technology well suited for this situation. In this concept, many physically separated access points are deployed within a conventional cell and the cell boundaries can be more or less erased. Each user is served by a subset of the access points, typically the ones that have a sufficiently high SNR to the user. That subset is partially overlapping between neighboring users and thus the access points does not necessarily have to be divided into disjoint sets, as would be the case in conventional cellular networks. Two benefits of cell-free (distributed) massive MIMO is that interference is coordinated over the entire network, to avoid inter-cell interference, and macro-diversity helps to mitigate shadow fading.

FIG. 1 illustrates a deployment example depicting how a distributed massive MIMO system may be used indoor in a building (e.g. factory). A central unit (CU) controls a plurality of antennas, or access points. Antennas used to serve the user terminal 1 in this example are marked with thick solid lines in the circles around the antennas.

One area where the disclosure below is of interest is as a method of enabling very reliable wide area transmissions in 5G New Radio (NR). Support for massive MIMO is a cornerstone in the 5G NR design and while massive MIMO (centralized or distributed) is extremely efficient to beamform signals to a single user, there is also a need for creating wide-beam transmissions that covers the area effectively. Signals for initial discovery and synchronization, system information, and paging are examples of transmissions that are required in a communication system that must be transmitted in wide and area covering beams. In some situations, there is also a need to provide control information to a user terminal which is connected or inactive (i.e. in an RRC CONNECTED or RRC INACTIVE state) without any channel state information available in the network. For example, to initiate a pilot transmission from the UE the network may need to send a control information in a wide area. Also, some data packets may be very delay sensitive and there is no time to acquire channel state information before transmitting a first data packet to a UE. In such ultra-reliable low latency (URLL) application a very robust and area covering transmission format may be preferable.

Wide beam and area covering transmissions are critical for an effective system operation. For traditional centralized massive MIMO there exist known methods to transmit signals in wide-beams (e.g. beam-sweeping or using the method disclosed in US 2012/0212372 A1). But for distributed massive MIMO no similarly effective technique is known in prior art. How to efficiently perform wide area broadcast transmission of signals in a distributed massive MIMO deployment is an open issue in prior art.

Space-frequency block codes (SFBC) are used for transmission of downlink control information and broadcasting of system information in LTE (Long-Term Evolution), see FIG. 2. The upper left and the lower right parts of the figure shows the 2 antenna port and 4 antenna ports transmission schemes used in LTE, respectively. For the 2 antenna case LTE uses an Alamouti code over the antenna and frequency domains. Other space-time or space-frequency or space-time-frequency codes are known in prior are, but for the sake of explaining the disclosure we will use this two antenna Alamouti code in our examples. The 4 antenna SFBC code used in LTE is essentially a combination of two Alamouti codes as can be seen by examining the lower right part of FIG. 2.

In 5G NR the initial cell search will be based on transmissions of SS (Synchronization Signal) Blocks, as depicted in FIG. 3. An SS Block in NR consist of (at least) a primary and secondary synchronization signal (denoted NR-PSS and NR-SSS). The sequence index of these signals constitutes a physical cell identity (PCI) used for scrambling and demodulation of other channels, such as the NR Physical Broadcast Channel (NR-PBCH). The NR-PBCH contains the master information block (NR-MIB) that the UE need to obtain in order to receive the minimum system information and to determine the system timing.

To support beam-sweeping transmissions the SS Blocks can be transmitted in periodic SS Bursts and there may be several SS Bursts in a SS Burst Set. A UE located in an area covered by one beam only will receive one SS Block during every SS Burst Set duration (e.g. 20 ms).

A UE may receive multiple SS Burst transmissions if several beams cover its location.

SUMMARY

The inventors have developed procedures suitable for transmitting SS Bursts and similar signaling in a network with a distributed MIMO deployment, such as a distributed massive MIMO deployment.

According to a first aspect, there is provided a method of transmitting a block of data in a distributed MIMO system. The distributed MIMO system comprises a plurality of access points, wherein access points are grouped into a first set of M groups and a second set of M groups, different from the first set, wherein M is an integer. A first antenna port mapping assigns each group of the first set to a unique one of M antenna ports. A second antenna port mapping assigns each group of the second set to a unique one of M antenna ports. The method comprises transmitting the block of data using both the first and the second antenna port mapping.

Transmitting the block of data may comprise, in a first time slot, transmitting the block of data using the first antenna port mapping, and, in a later second time slot, transmitting the block of data using the second antenna port mapping.

Alternatively or additionally, transmitting the block of data may comprise, in a first frequency band, transmitting the block of data using the first antenna port mapping, and, in a second frequency band, transmitting the block of data using the second antenna port mapping.

The block of data may be represented with symbols coded with a space-time-frequency block code, such as an Alamouti code.

In some embodiments, the block of data is a synchronization signal block, comprising at least one synchronization signal. The synchronization signal block may comprise a primary and a secondary synchronization signal.

In some embodiments, the block of data represents a broadcast channel, such as NR-PBCH.

In some embodiments, access points are grouped into at least a third (e.g., a third; a third and a fourth; a third, a fourth, and a fifth; . . . ) set of M groups, each different from each other and from the first set and the second set. For each of the at least third set, an associated antenna port mapping assigns each group of that set to a unique one of M antenna ports. The method may comprise also transmitting the block of data using each of said associated antenna port mappings.

According to a second aspect, there is provided a cluster of access points for a distributed MIMO system. The cluster comprises a connection interface configured to be connected to a central unit of the distributed MIMO system and receive blocks of data to be transmitted from the central unit. The cluster further comprises a plurality of access points. Each access point comprises a transceiver for communicating wirelessly with wireless devices, a processing circuit, and a communication interface connected to said connection interface. The processing circuits of the plurality of access points are configured to control the transceivers to transmit the blocks of data according to the method of the first aspect.

According to a third aspect, there is provided a central unit for a distributed MIMO system. Said distributed MIMO system comprises a plurality of access points. The central unit comprises a communication interface for communicating with the access points and a processing circuit configured to control the access points to transmit blocks of data according to the method of the first aspect.

According to a fourth aspect, there is provided a distributed MIMO system configured to transmit blocks of data according to the method of the first aspect.

According to a fifth aspect, there is provided a computer program product comprising computer program code for causing access points of a distributed MIMO system to transmit blocks of data according to the method of any the first aspect when said computer program code is executed by processing circuits of the access points.

According to a sixth aspect, there is provided a computer program product comprising computer program code for causing access points of a distributed MIMO system to transmit blocks of data according to the method of the first aspect when said computer program code is executed by a processing circuit of a central unit of the distributed M IMO system.

According to a seventh aspect, there is provided a computer readable medium, such as a non-transitory computer-readable medium, having stored thereon the computer program product of the fifth or the sixth aspect.

BRIEF DESCRIPTION OF THE DRAWINGS

FIGS. 10-12 are block diagrams.
FIGS. 13-15 show flow charts.

DETAILED DESCRIPTION

This disclosure aims at providing an efficient method of transmitting SS Bursts and similar signaling in a network with a distributed MIMO deployment, such as a distributed massive MIMO deployment.

The term "access point" is used in this disclosure. Sometimes, "antenna" or "antenna element" is used with the same meaning in the field of MIMO transmissions.

Distributed massive MIMO is a promising technique in many scenarios. However, no effective solutions for broadcasting of e.g. system information in such cell-free/distributed networks are known.

Existing solutions for broadcasting of system information come in two categories:

1) Assuming conventional cellular operation and using diversity transmission techniques. Here, one common diversity technique is the beam-sweeping method, which is only well-defined for co-located antenna arrays that form beams in angular directions, and not for cell-free networks with distributed antenna elements where the radiation pattern is shaped by the transmission from many access points. Another diversity technique is space-time coding, but this technique is also developed for cellular systems and is not directly applicable in a cell-free network. In particular, it requires the transmission of downlink pilots which does not scale in a cell-free system where the number of access points can be vastly larger than the number of samples per channel coherence block. Antenna hopping is another example of techniques in this category, but it does not work in cell-free because of a similar scalability problem.

2) Single-frequency network broadcasting, where every access point sends the same signal. Here, no spatial diversity against small scale fading is achieved and hence the reliability of the broadcasted signal is degraded by channel fading. This is particularly serious for applications with narrowband signals and applications where there is little mobility (internet-of-things. MTC, . . . ).

Figure 1:
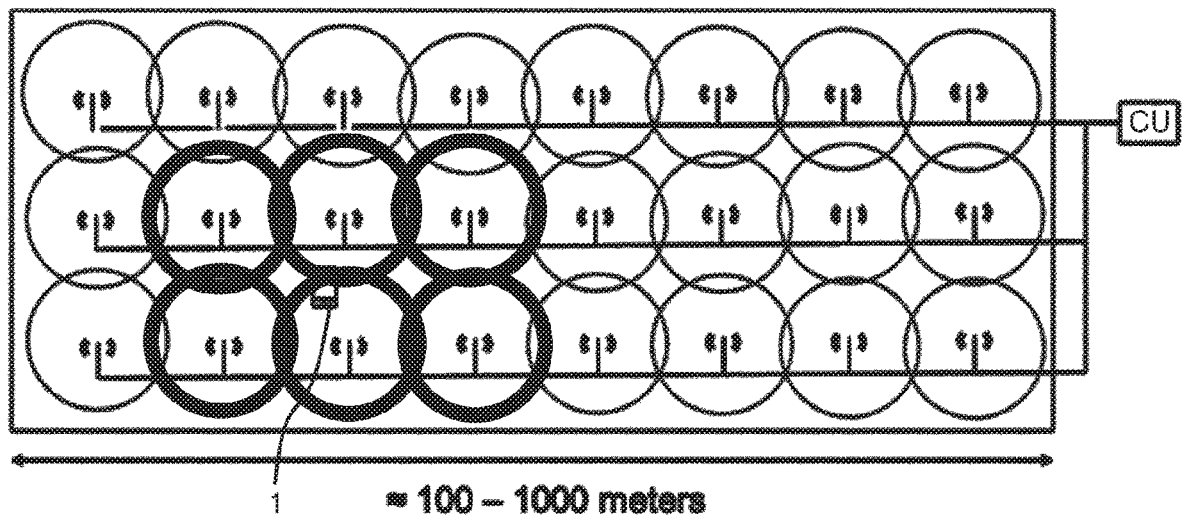
FIG. 1 illustrates a deployment scenario.
Figure 2:
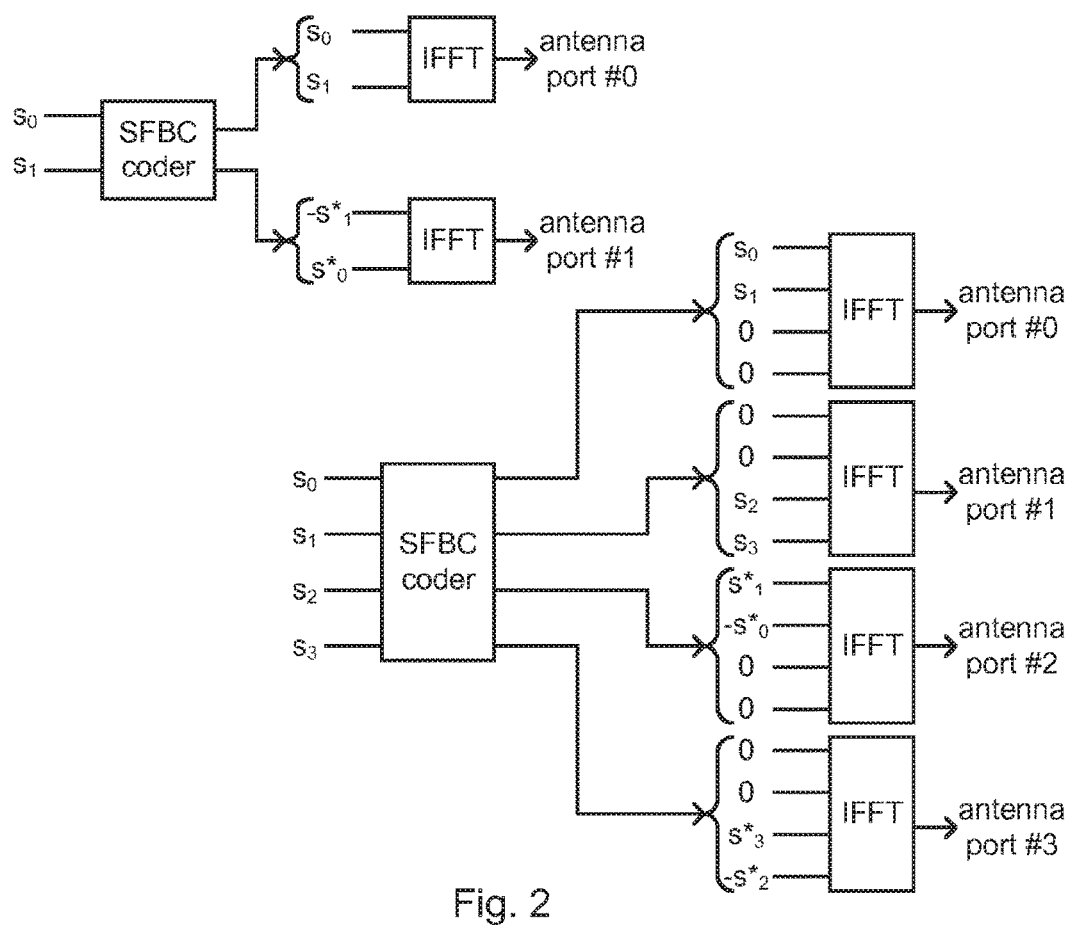
FIG. 2 illustrates an Alamouti code.
Figure 3:
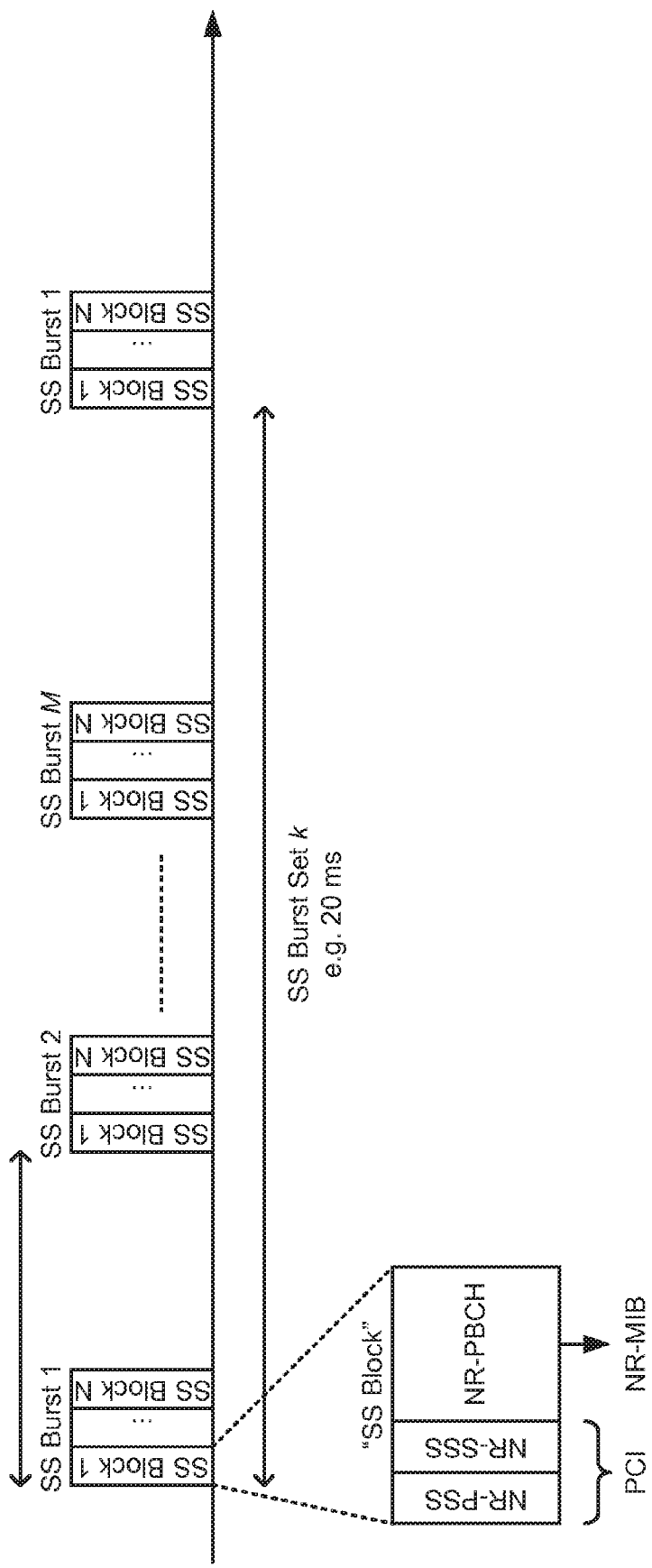
FIG. 3 illustrates SS Blocks transmitted in SS bursts.
Figure 4:
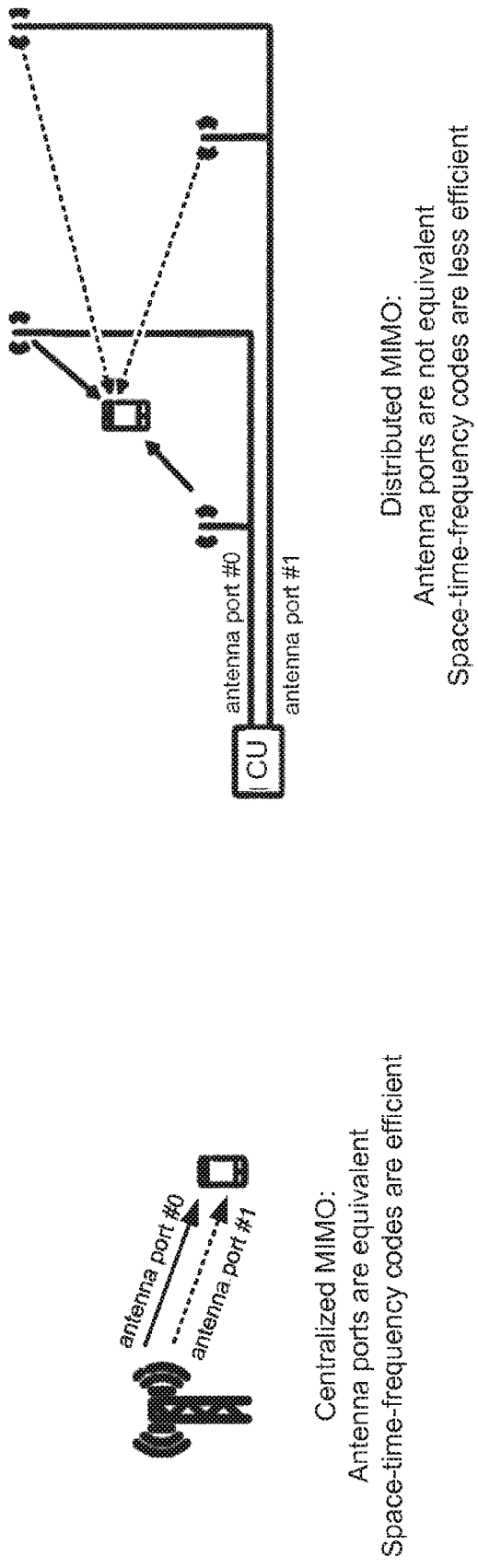
FIG. 4 illustrates differences between a localized massive MIMO system and a distributed massive MIMO system.

Space-time-frequency block codes are straightforward to apply in both centralized and distributed antenna ports, as depicted in FIG. 4, where a UE sees two antenna ports; antenna port #0 (solid arrows) and antenna port #1 (dashed arrows). One difference is that in a centralized deployment of antenna ports (left part of the figure), all ports have equivalent large scale fading properties, while this is not the case in a deployment with distributed antenna elements (right part of the figure). In the latter case, antennas of antenna port #1 are located further away, and they will be less effective in providing diversity to the UE. In case the signals that constitute antenna port #0 (transmitted from the antennas closest to the UE in this example) happen to add up destructively, due to unfortunate fast fading, then the UE may not be able to decode the transmission from the network. In this example the unfortunate mapping of the two nearest antenna elements to the same antenna port in the space-time-frequency code was problematic. It is an objective of some embodiments of the present disclosure to avoid this kind of operation when applying space-time-frequency codes to distributed antenna deployments.

According to some embodiments of this disclosure, the access points jointly broadcast system information using a diversity scheme consisting of a hybrid between space-time block coding and access point hopping. Such a scheme provides diversity towards small-scale channel fading and macro-diversity.

According to some embodiments, the UE can also extract context information from the system information broadcast, which describes the subset of access points that provide the largest SNRs, and use this information to determine how to further access to the network.

In some embodiment, time is slotted. In even slots, a first set S1 of groups of access points (APs) transmit system information using space-time coding. This set is further partitioned into ports S1P1, S1P2, S1P3, . . . , one group of the set is assigned to each port, where the number of ports equals the spatial dimension of the space-time code. Each port (or group) contains at least one AP and if there are multiple APs then these operate as a single antenna port in the transmission of this slot. The space-time code is transmitted over these antenna ports and the transmission may also include downlink pilots.

In odd slots, a different antenna-port mapping is used. Here, a second set S2 of groups of APs transmit system information using space-time coding. This set is further partitioned into ports S2P1, S2P2, S2P3 . . . , one group of the set is assigned to each port, where again the number of ports equals the spatial dimension of the space-time code. Again, each port (or group) contains at least one AP and if there are multiple APs then these operate as a single antenna port in the transmission of this slot. Similarly to even slots, the space-time code is transmitted over these antenna ports and the transmission may also include downlink pilots.

The space-time coded transmission provides diversity towards small-scale fading and thereby improves the reliability of the transmission. The spatial diversity is particularly important for broadcast of small data quantities, for which time and frequency diversity cannot be efficiently exploited.

The sets S1 and S2 may overlap, i.e. they may be built op of the same and partly the same APs. However, some APs belonging to groups in the first set S1 may be inactive in the second set S2, i.e. not belonging to any group in the second set S2. Similarly, some APs belonging to groups in the second set S2 may be inactive in the first set S1, i.e. not belonging to any group in the first set S1. Ports/groups in different subsets may also partly overlap, i.e., comprise partially the same APs. However, to provide additional diversity, the sets S1 and S2 are different, i.e. they do not comprise the same groupings of APs.

Figure 5:
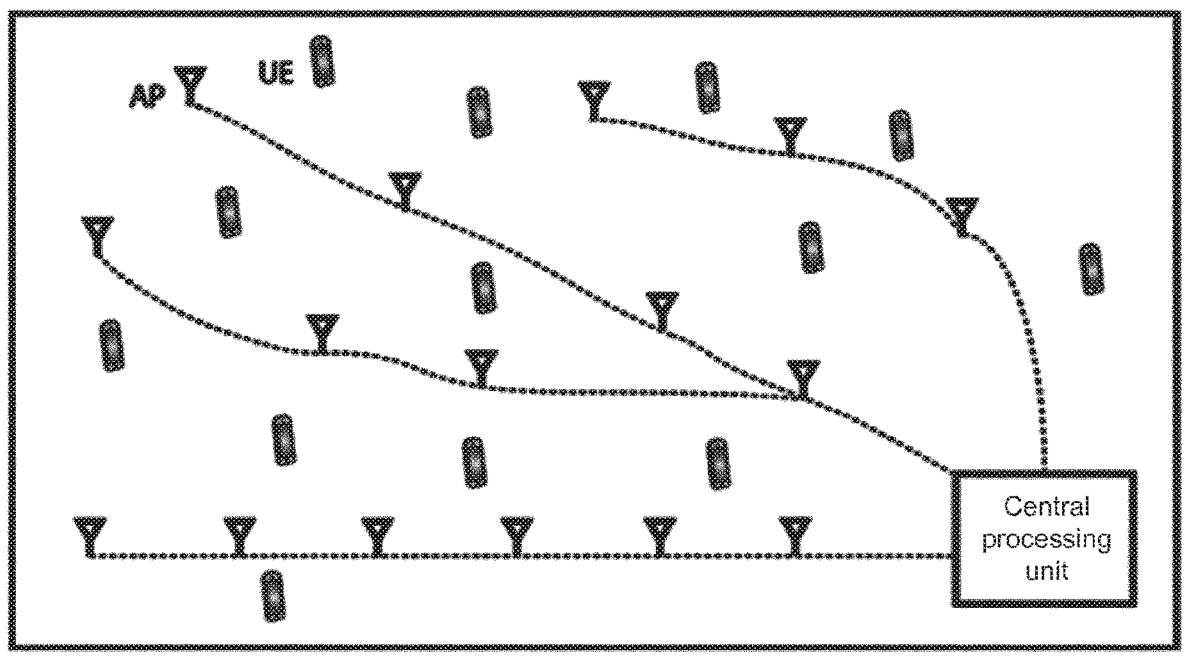
FIGS. 5-9 illustrates an example.

FIG. 5 illustrates a distributed massive MIMO system with APs, or antenna elements, and terminals according to an example.

Figure 6:
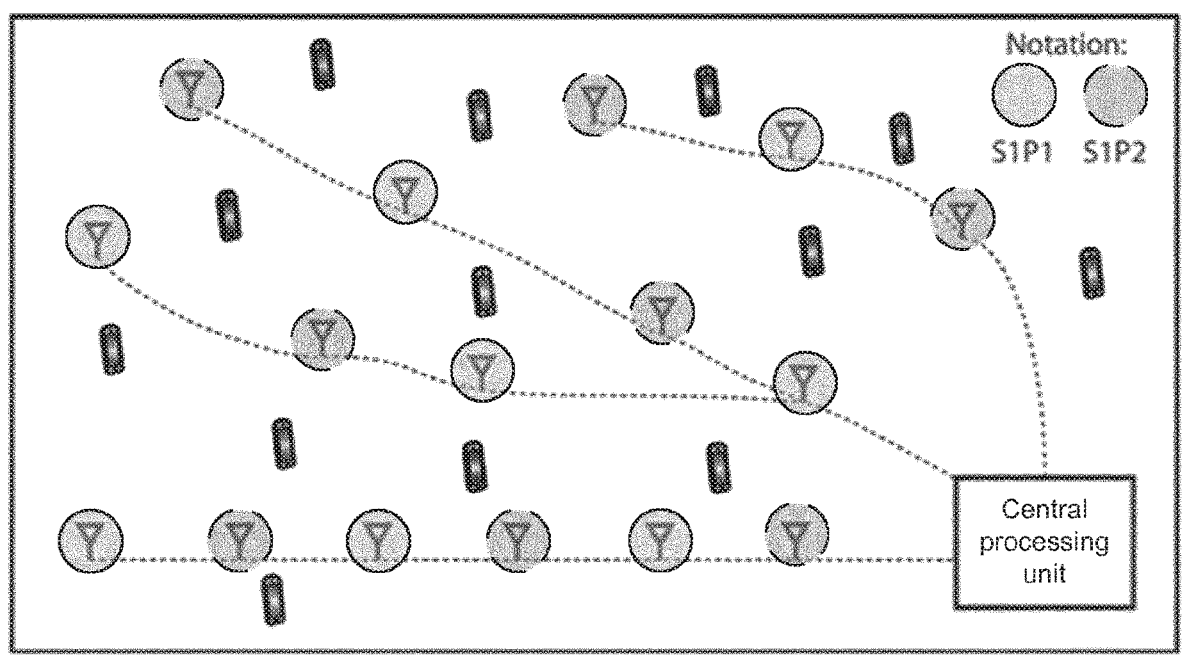

FIG. 6 shows an example of transmission in even slots. Which APs belong to which port, or group, S1P1 or S1P2, is indicated in the figure. Here, a two-dimensional space-time code is transmitted. The APs in S1P1 form an antenna port that coherently transmits the first half of the code. The APs in S1P2 form an antenna port that coherently transmits the second half of the code.

Figure 7:
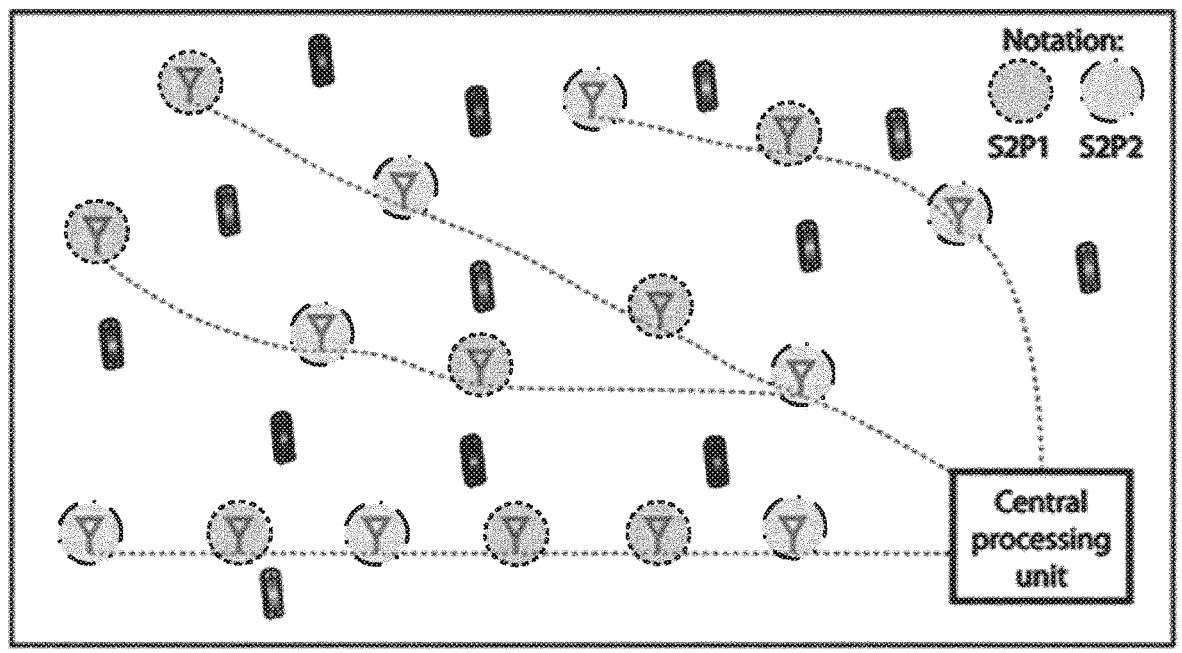

FIG. 7 similarly shows an example of transmission in odd slots. Which APs belong to which port, S2P1 or S2P2, is indicated in the figure. The APs in S1P1 form an antenna port that coherently retransmits the first half of the code. The APs in S1P2 form an antenna port that coherently retransmits the second half of the code.

Figure 8:
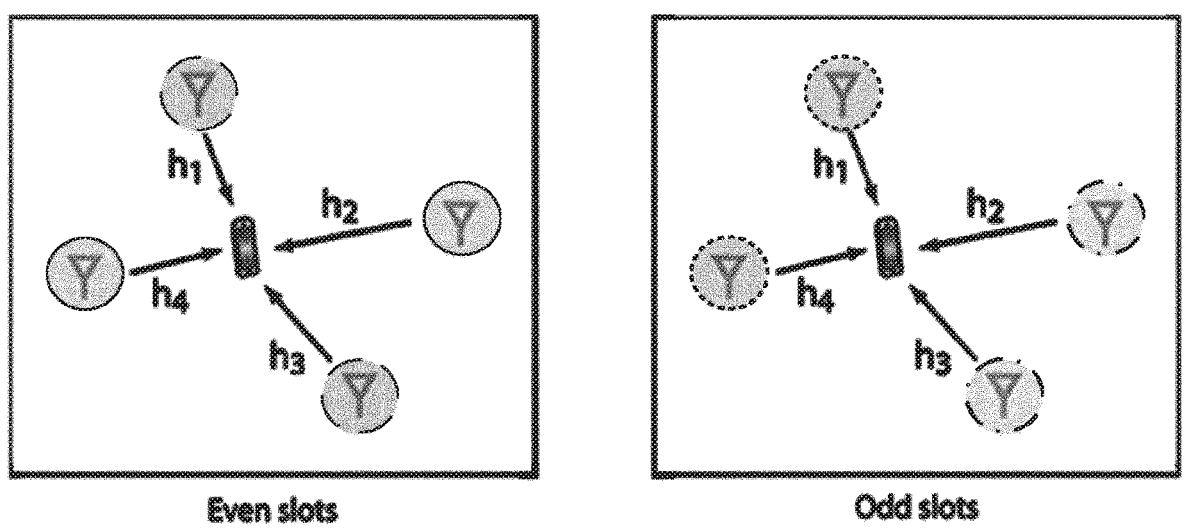

Consider, for example, a single-antenna terminal ("wireless device") that is reached by four APs in the network. The channel coefficients from the APs are denoted by $h_1$, $h_2$, $h_3$ and $h_4$. The APs are mapped into antenna ports in different ways in even and odd slots, as illustrated in FIG. 8. Two downlink pilots are transmitted so that the terminal can estimate the combined channel coefficients $g_1$, $g_2$ from each of the antenna ports. In even slots, $g_1=h_2+h_4$ (for antenna port S1P1) and $g_2=h_1+h_3$ (for antenna port S1P2). In odd slots, $g_1=h_1+h_4$ (for antenna port S2P1) and $g_2=h_2+h_3$ (for antenna port S2P2).

Let $x_1$, $x_2$ denote the symbols that are transmitted in one block of a two-dimensional space-time code. If an Alamouti code is used, these symbols are transmitted over two channel uses. Consider an even slot. The APs of the first antenna port (S1P1) sends $x_1$ followed by $-x_2^*$. The APs of the second antenna port (S1P2) sends $x_2$ followed by $x_1^*$, where the * denotes complex conjugation. The first received signal at the terminal is $$y_1 = [g_1 \ g_2]\begin{bmatrix} x_1 \\ x_2 \end{bmatrix} + n_1 \quad (2)$$

and the second received signal is $$y_2 = [g_1 \ g_2]\begin{bmatrix} -x_2^* \\ x_1^* \end{bmatrix} + n_2 \quad (3)$$

where $n_1$, $n_2$ are independent Gaussian noise terms. The receiving terminal can now form the two-dimensional received signal $$\begin{bmatrix} y_1 \\ y_2^* \end{bmatrix} = \begin{bmatrix} g_1 x_1 + g_2 x_2 \\ g_2^* x_1 - g_1^* x_2 \end{bmatrix} + \begin{bmatrix} n_1 \\ n_2^* \end{bmatrix} = \begin{bmatrix} g_1 & g_2 \\ g_2^* & -g_1^* \end{bmatrix} \begin{bmatrix} x_1 \\ x_2 \end{bmatrix} + \begin{bmatrix} n_1 \\ n_2^* \end{bmatrix} \quad (4)$$

which is equivalent to a full-rank 2×2 MIMO channel. Note that this channel structure is obtained although the terminal has only one antenna and the APs have no channel state information. Since the terminal knows the channel coefficients it can decouple the reception of $x_1$, $x_2$ as $$\begin{bmatrix} g_1^* & g_2 \\ g_2^* & -g_1 \end{bmatrix}\begin{bmatrix} y_1 \\ y_2^* \end{bmatrix} = \begin{bmatrix} |g_1|^2 + |g_2|^2 & 0 \\ 0 & |g_1|^2 + |g_2|^2 \end{bmatrix}\begin{bmatrix} x_1 \\ x_2 \end{bmatrix} + \begin{bmatrix} n_1' \\ n_2' \end{bmatrix} \quad (5)$$

where the noise vector $$\begin{bmatrix} n_1' \\ n_2' \end{bmatrix} = \begin{bmatrix} g_1^* & g_2 \\ g_2^* & -g_1 \end{bmatrix}\begin{bmatrix} n_1 \\ n_2^* \end{bmatrix} \quad (6)$$

has independent Gaussian noise terms with the same distribution as $n_1$, $n_2$ but a variance scaled by $(|g_1|^2+|g_2|^2)$. The resulting SNR is proportional to $|g_1|^2+|g_2|^2$ and thus the space-time code provides a second-order spatial diversity.

In a subsequent odd slot, the transmission is repeated, but with different antenna ports. The APs of the first antenna port (which is now S2P1) sends $x_1$ followed by $-x_2^*$. The APs of the second antenna port (which is now S2P2) sends $x_2$ followed by $x_1^*$.

Figure 9:
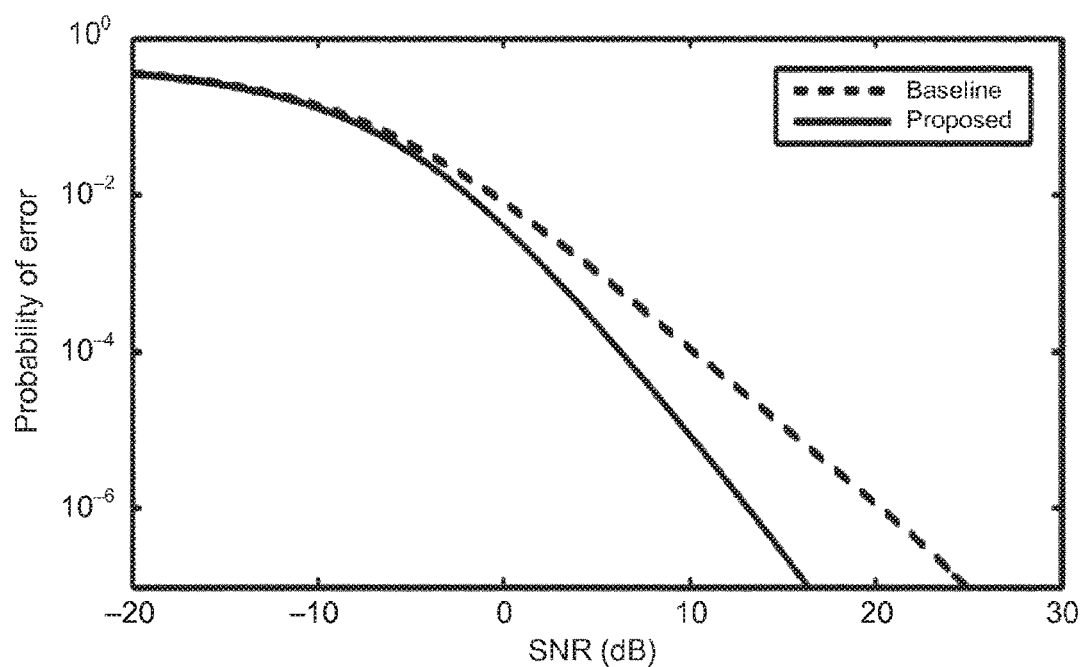

By broadcasting the same system information in consecutive even and odd slots, the terminal can combine the received signals to achieve an SNR proportional to $$|h_2+h_4|^2+|h_1+h_3|^2+|h_1+h_4|^2+|h_2+h_3|^2 \qquad (7)$$

which basically provides fourth-order spatial diversity. FIG. 9 demonstrates this in terms of the probability of error in BPSK (binary phase-shift keying) transmission, when the channel coefficients are independent Rayleigh fading and constant for two consecutive slots. The proposed method is compared with a baseline scheme where the same port mapping is used in both odd and even slots, thus only a second-order diversity is achieved and the combining of consecutive slots only provide a power gain.

The increased diversity order leads to higher reliability in the system information broadcast.

Every terminal wants its closest APs (the ones that are most likely to provide strong channel coefficients) to belong to different antenna ports to make the most out of the spatial diversity. The gain from switching antenna port mappings between slots can be particularly large in irregular antenna deployments, where one cannot find a single mapping that fits all user positions.

In another embodiment, the frequency domain is partitioned into segments. The same procedure as above is applied, but with "time" and "frequency" interchanged.

In another embodiment, a combination between time and frequency slotting is used.

In some embodiments, the APs may be divided into multiple independent collections of APs. Each collection operates according to the above procedures, but there might be mutual interference between the collections. The collections can be selected to make the mutual interference low.

In addition to reliable decoding of the system information broadcast, the user terminal can determine which sets and which antenna ports that provide the largest and most reliable channel gains. This information indicates which APs that later should transmit payload data to the user. The user (or "terminal" or "wireless device") can utilize this information when accessing the network. In one embodiment, the access scheme is determined by which sets and ports that provided large/reliable channel gains. In another embodiment, the user access the network in a predetermined way, but feeds back said information to the network.

In one embodiment related to 5G NR the method described above is used in a first timeslot to transmit an SS Block and in a second time slot to transmit another SS Block, where both said first and said second SS Blocks are part of the same SS Burst or part of the same SS Burst Set.

In one embodiment related to 5G NR the method described above is used in multiple time-slots to transmit SS Blocks belonging to the same SS Burst or SS Burst Set.

Description of Block Diagrams

Figure 10:
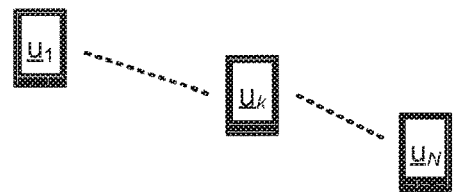
Figure 10:
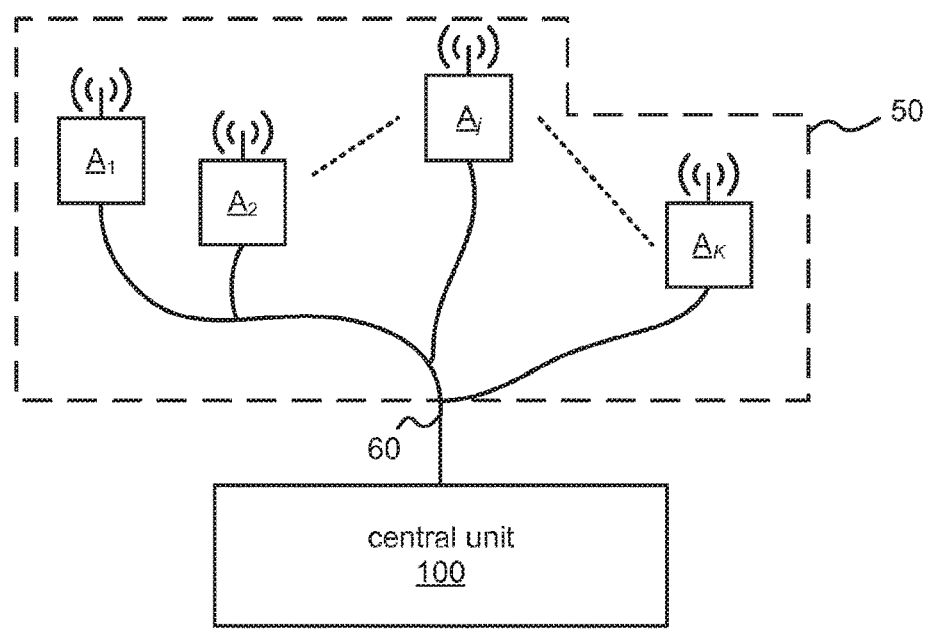

FIG. 10 is a block diagram of a distributed MIMO system according to an embodiment. It comprises a plurality of access points $A_1, \ldots, A_K$. The plurality of access points $A_1, \ldots, A_K$ form a cluster 50 of access points. The distributed MIMO system further comprises a central unit 100. The cluster 50 comprises a connection interface configured to be connected to the central unit 100 of the distributed MIMO system and receive blocks of data, such as the above-mentioned SS blocks, to be transmitted from the central unit 100. Other types of data and control signaling may also take place over the connection interface 60. The connection interface 60 may e.g. be a bus interface. The central unit 100 provides backhaul, implement functionalities in higher layer protocols (TCP/IP, PDCP, RLC, MAC) and may also perform a large part of the base-band physical layer processing such as channel coding and decoding, modulation, etc. The central unit 100 may also coordinate calculations that are performed relatively seldom; such as determining which access points that should serve which users; ensure that the nodes are properly calibrated and synchronized; assign pilots to users to be used for channel estimation; make handover decisions to other central units in the vicinity; etc.

In the example shown in FIG. 4, the distributed MIMO system has a number N of wireless devices $u_1, \ldots, u_N$ within its coverage area, such as mobile phones or other types of UEs (User Equipment). These correspond to what is referred to above as "users" or "terminals".

FIG. 11 is a simplified block diagram of an access point $A_j$ according to an embodiment. It comprises a transceiver a transceiver 52 configured to communicate wirelessly with wireless devices $u_k$. Furthermore, it comprises a processing circuit 54. The processing circuit 54 may be a programmable processing circuit 54, and may e.g. comprise a processor 56 and memory 58. The memory 58 may e.g. store computer program code executable by the processor 56. The access point $A_j$ may also comprise a communication interface 55 configured to communicate with the central unit 100, as indicated in FIG. 11. For example, the communication interface 55 may be connected to the connection interface 60 of the cluster 50. The terms "connection interface" and "communication interface" are used in this disclosure as labels to distinguish the two interface.

FIG. 12 is a simplified block diagram of the central unit 100 according to an embodiment. It comprises a communication interface 102 configured to communicate with access points $A_1, \ldots, A_K$ of the distributed MIMO system, e.g. through the communication interface 55 (FIG. 5). Furthermore, it comprises a processing circuit 104. The processing circuit may be configured to control the access points $A_1, \ldots, A_K$ in various ways. For example, it may be configured to provide data to be transmitted to the wireless devices $u_1, \ldots, u_N$. The processing circuit 104 may be a programmable processing circuit 104, and may e.g. comprise a processor 106 and memory 108. The memory 108 may e.g. store computer program code executable by the processor 106.

Description of Flowcharts

According to some embodiments of the present disclosure, there is provided a method 200 of transmitting a block of data in the distributed MIMO system. As mentioned above, the block of data may be represented with symbols coded with a space-time-frequency block code (STFBC), such as an Alamouti code. As indicated above, the block of data may be a synchronization signal block, comprising at least one synchronization signal, such as a primary and a secondary synchronization signal. Furthermore, as also indicated above the block of data may represent a broadcast channel, such as NR-PBCH. More generally, the block of data may be a block of data that should be subject to a wide-area transmission, such as a broadcast transmission.

According to some embodiments, access points $A_g$ are grouped into a first set of M groups and a second set of M groups, different from the first set, wherein M is an integer.

A first antenna port mapping assigns each group of the first set to a unique one of M antenna ports. The word "unique" here means that there are not two groups in the first set that are mapped onto one and the same antenna port. A second antenna port mapping assigns each group of the second set to a unique one of M antenna ports. For example, with reference to the example in FIGS. 5-7, a first group of the first set is formed by the access points that are mapped onto the antenna port S1P1 (FIG. 6), and a second group of the first set is formed by the access points that are mapped onto the antenna port S1P2 (FIG. 6). Similarly, a first group of the second set is formed by the access points that are mapped onto the antenna port S2P1 (FIG. 7), and a second group of the first set is formed by the access points that are mapped onto the antenna port S2P2 (FIG. 7). Hence, in this example, M=2. In the example illustrated with FIGS. 5-7, all access points belong to a group that is mapped onto an antenna port. However, in some embodiments, some access points may sometimes be unused, or inactivated, and not mapped onto any antenna port. Which these access points are may be different for the first set and the second set. In some embodiments, all of the APs used in the first set may be inactivated in the second set, and vice versa. For example half of the APs in the cluster 50 may be used in the groups of the first set (but not the second set), and the other half of the APs in the cluster 50 may be used in the groups of the second set (but not the first set).

Embodiments of the method 200 comprises transmitting the block of data using both the first and the second antenna port mapping. As explained above, this is a relatively efficient way to provide transmit diversity in the distributed MIMO system. A flowchart of an embodiment of the method 200 is shown in FIG. 13. Operation of the method is started in step 210. In step 220, the block of data using both the first and the second antenna port mapping. Operation of the method 200 is ended in step 230. The method 200 may be repeated as necessary, for instance whenever a new SS burst is to be transmitted.

It should be noted that some embodiments may involve more than two sets and two antenna mappings. For example, access points $A_j$ may be grouped into a third (and a fourth, and a fifth, . . . ) set of M groups, different from the first set and the second set (and different from each other if one or more sets than the third set are used). Furthermore, a third (and a fourth, and a fifth, . . . ) antenna port mapping may assign each group of the third (fourth, fifth, . . . ) set to a unique one of M antenna ports. To provide an even further degree of diversity, the block of data may be transmitted using also the third (fourth, fifth, . . . ) antenna port mapping.

In some embodiments, the method operates according to a slotted time, as described above. This is illustrated in FIG. 14, where step 220 the block of data comprises, in a first time slot, transmitting 221 the block of data using the first antenna port mapping, and in a later second time slot, transmitting 222 the block of data using the second antenna port mapping. As indicated in FIG. 14, step 220 may optionally also in a further later time slot comprise transmitting 223 the block of data using the third antenna port mapping. In some embodiments, further later time slots may be used for transmitting the block of data using additional antenna port mappings (fourth, fifth, . . . ).

Figure 15:
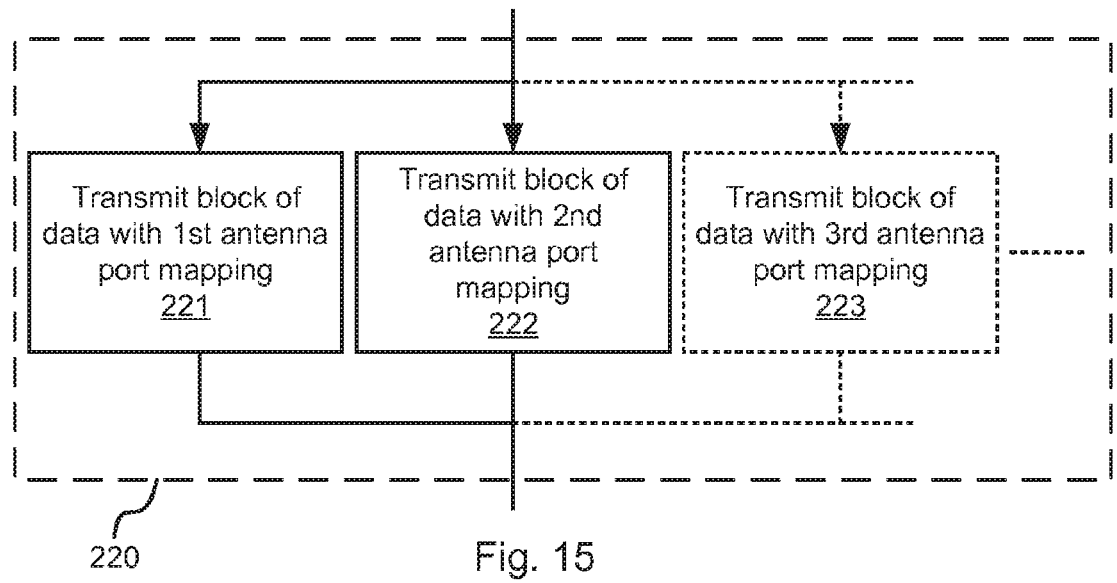

In some embodiments, the block of data may be transmitted using the first and the second antenna port mappings concurrently. This is illustrated in FIG. 15, wherein steps 221 and 222 (and optionally step 223, etc.) are carried out concurrently. This may e.g. be accomplished through the use of frequency division, where step 221 includes transmitting the block of data using the first antenna port mapping in a first frequency band, and step 222 comprises transmitting the block of data using the second antenna port mapping in a second frequency band. In an OFDM system, the first and second frequency bands may correspond to a first and a second set of subcarriers.

It should be noted that the slotted time and frequency division described above can be combined. For example, step 221 may comprise transmitting the block of data using the first antenna port mapping in the first time slot and in the first frequency band. Step 222 may comprise transmitting 222 the block of data using the second antenna port mapping in the later second time slot and in the second frequency band.

According to embodiments of the present disclosure, the distributed MIMO system is configured to transmit blocks of data according to the method 200 of any one of the examples. In some embodiments, this is controlled from the central unit 100. For example, the processing circuit 104 may be configured to control the access points $A_1, \ldots, A_K$ to transmit blocks of data according to the method 200, for instance by providing each access point $A_j$ with control signals indicating which antenna port it belongs to for a given transmission.

In some embodiments, the operation of the method 200 is controlled within the cluster 50 of access points $A_1, \ldots, A_K$. For example, the processing circuits 54 of the of access points $A_1, \ldots, A_K$ may be configured to control the transceivers 52 to transmit the blocks of data according to the method 200. The processing circuit 54 of any given access point $A_j$ may e.g. be preconfigured to keep track of in which time slot (and/or in which frequency band) that access point belongs to a given antenna port. In such embodiments, the central unit 100 does not have to keep track of the antenna port mappings, but can simply supply the blocks of data to be transmitted to the access points $A_1, \ldots, A_K$ over the connection interface 60.

In other embodiments, the cluster 50 and the central unit 100 may jointly be in control over the operation of the method 200.

Description of Computer-Readable Media Figures

As described above with reference to FIGS. 11 and 12, the processing circuits 54 and 104, or parts thereof, may be implemented with programmable and/or configurable hardware units, such as but not limited to one or more field-programmable gate arrays (FPGAs), processors, or microcontrollers. Thus, the processing circuits 54 and 104 may be a programmable processing circuits. Hence, embodiments of the present disclosure may be embedded in computer program products, which enables implementation of the methods and functions described herein, e.g. the embodiments of the method 200 described with reference to FIGS. 13-15.

Figure 16:
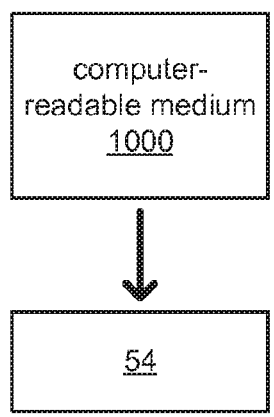
FIGS. 16-17 schematically illustrate computer-readable media and processing circuits.

According to some embodiments, there is provided a computer program product comprising computer program code for causing the access points $A_1, \ldots, A_K$ to transmit blocks of data according to the method 200 when said computer program code is executed by the processing circuits 54 of the access points $A_1, \ldots, A_K$. The computer program code may be stored on a computer readable medium 1000, as illustrated in FIG. 16. The computer-readable medium 1000 may e.g. be a non-transitory computer-readable medium. The computer program code may be loadable into the memory 58 in order to be executed by the processor 56.

Figure 17:
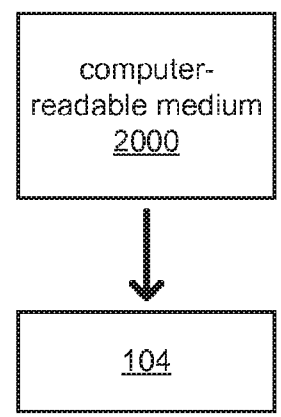

According to some embodiments, there is provided a computer program product comprising computer program code for causing the access points $A_1, \ldots, A_K$ to transmit blocks of data according to the method 200 when said computer program code is executed by the processing circuit 104 of the central unit 100. The computer program code may be stored on a computer readable medium 2000, as illustrated in FIG. 17. The computer-readable medium 2000 may e.g. be a non-transitory computer-readable medium. The computer program code may be loadable into the memory 108 in order to be executed by the processor 106.

The present disclosure has been presented above with reference to specific embodiments. However, other embodiments than the above described are possible within the scope of the disclosure. Different method steps than those described above, performing the method by hardware or software, may be provided within the scope of the disclosure. The different features and steps of the embodiments may be combined in other combinations than those described.

The term "comprises/comprising" when used in this disclosure is taken to specify the presence of stated features, integers, steps, or components, but does not preclude the presence or addition of one or more other features, integers, steps, components, or groups thereof.

The invention claimed is:

1. A method of transmitting a block of data in a distributed multiple-input multiple-output (MIMO) system, wherein the distributed MIMO system comprises:
a plurality of access points;
and wherein
the access points are grouped into a first set of M groups and a second set of M groups, different from the first set, wherein M is an integer;
a first antenna port mapping assigns each group of the first set to a respective unique one of M antenna ports; and
a second antenna port mapping assigns each group of the second set to a respective unique one of M antenna ports;
the method comprising:
transmitting the block of data using both the first and the second antenna port mapping.

2. The method of claim 1, wherein transmitting the block of data comprises:
in a first time slot, transmitting the block of data using the first antenna port mapping; and
in a later second time slot, transmitting the block of data using the second antenna port mapping.

3. The method of claim 1, wherein transmitting the block of data comprises:
in a first frequency band, transmitting the block of data using the first antenna port mapping; and
in a second frequency band, transmitting the block of data using the second antenna port mapping.

4. The method of claim 1, wherein the block of data is represented with symbols coded with a space-time-frequency block code.

5. The method of claim 4, wherein the space-time-frequency block code is an Alamouti code.

6. The method of claim 1, wherein the block of data is a synchronization signal block, comprising at least one synchronization signal.

7. The method of claim 6, wherein the synchronization signal block comprises a primary and a secondary synchronization signal.

8. The method of claim 1, wherein the block of data represents a broadcast channel.

9. The method of claim 1, wherein
access points are grouped into at least a third set of M groups, each different from each other and from the first set and the second set; and
for each of the at least third set, an associated antenna port mapping assigns each group of that set to a respective unique one of M antenna ports;
the method further comprising:
transmitting the block of data also using each of said associated antenna port mappings.

10. A central unit for a distributed MIMO system, wherein said distributed MIMO system comprises a plurality of access points, the central unit comprising:
a communication interface for communicating with the access points; and
a processing circuit configured to control the access points to transmit blocks of data according to the method of claim 1.

11. A for a distributed MIMO system, comprising:
a connection interface configured to be connected to a central unit of the distributed MIMO system and receive blocks of data to be transmitted from the central unit;
a plurality of access points, each comprising
a transceiver for communicating wirelessly with wireless devices;
a processing circuit; and
a communication interface connected to said connection interface;
wherein the access points are grouped into a first set of M groups and a second set of M groups, different from the first set, wherein M is an integer, and wherein processing circuits of the plurality of access points are configured to control the transceivers to transmit one or more of the blocks of data using both a first antenna port mapping and a second antenna port mapping, wherein the first antenna port mapping assigns each group of the first set to a respective unique one of M antenna ports and the second antenna port mapping assigns each group of the second set to a respective unique one of M antenna ports.

* * * * *